(12) United States Patent
Perrin et al.

(10) Patent No.: US 9,284,849 B2
(45) Date of Patent: Mar. 15, 2016

(54) DEVICE FOR MONITORING THE FLAPPING AND/OR LAG BEHAVIOR OF A BLADE OF A ROTORCRAFT ROTOR

(71) Applicant: AIRBUS HELICOPTERS, Marignane (FR)

(72) Inventors: Christophe Perrin, Salon de Provence (FR); Nicolas Imbert, Marseilles (FR); Charles Chuc, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 474 days.

(21) Appl. No.: 13/792,807

(22) Filed: Mar. 11, 2013

(65) Prior Publication Data
US 2013/0243597 A1   Sep. 19, 2013

(30) Foreign Application Priority Data

Mar. 19, 2012   (FR) ..................... 12 00813

(51) Int. Cl.
| | |
|---|---|
| *F01D 7/00* | (2006.01) |
| *B64C 27/32* | (2006.01) |
| *B64C 27/00* | (2006.01) |
| *B64C 27/35* | (2006.01) |
| *B64C 27/51* | (2006.01) |
| *G01M 5/00* | (2006.01) |
| *B64D 45/00* | (2006.01) |

(52) U.S. Cl.
CPC .................. *F01D 7/00* (2013.01); *B64C 27/008* (2013.01); *B64C 27/32* (2013.01); *B64C 27/35* (2013.01);
(Continued)

(58) Field of Classification Search
CPC ... F01D 7/00; F01D 21/003; F05D 2270/808; F05D 2260/80; F05B 2270/808; F05B 2260/80; B64C 27/008; B64C 27/00; B64C 27/35; B64C 27/41; B64C 27/37; B64C 27/39; B64C 27/51; B64C 27/54; B64C 27/32; B64C 27/48; G01M 5/0041; G01M 5/0016; G01B 5/30; G01B 7/16; G01B 11/16; B64D 2045/0085; B64D 45/00
USPC ............. 244/17.13, 17.25, 17.27, 39; 416/61, 416/131; 415/118; 73/862.044, 862.045
See application file for complete search history.

(56) References Cited

U.S. PATENT DOCUMENTS

| | | | |
|---|---|---|---|
| 2,669,120 A * | 2/1954 | Jensen | B64C 27/008 73/147 |
| 4,273,511 A * | 6/1981 | Mouille | B64C 27/33 416/134 A |

(Continued)

FOREIGN PATENT DOCUMENTS

| | | | |
|---|---|---|---|
| DE | 19804717 A1 * | 8/1999 | ............. B64C 27/32 |
| DE | 102006037900 A1 | 2/2008 | |
| FR | 2774655 A1 | 8/1999 | |

OTHER PUBLICATIONS

Search Report and Written Opinion; Application No. FR 1200813; dated Dec. 3, 2012.

*Primary Examiner* — Thomas Denion
*Assistant Examiner* — Mickey France
(74) *Attorney, Agent, or Firm* — Brooks Kushman P.C.

(57) ABSTRACT

The present invention relates to a rotorcraft rotor (1) having a plurality of blades (3) movably mounted on a hub (2) via blade roots (4) that are respectively associated therewith. The rotor (1) is fitted with an information capture appliance having at least one measurement assembly (E1) comprising a flexible bar (11) interposed in engagement at its respective ends between the hub (2) and a blade root (4) that is allocated thereto. A strain gauge (7, 8) formed of a SAW transducer is implanted on the bar (11) and generates information relative to the bending of the bar (11) following tilting orientations of the blade root (4) in flapping (B) and/or in lag (T).

17 Claims, 4 Drawing Sheets

(52) U.S. Cl.
CPC ............ *B64C 27/51* (2013.01); *G01M 5/0016* (2013.01); *G01M 5/0041* (2013.01); *B64D 2045/0085* (2013.01)

(56) References Cited

U.S. PATENT DOCUMENTS

| | | | |
|---|---|---|---|
| 4,626,172 A * | 12/1986 | Mouille | B29D 99/025 416/134 A |
| 6,216,979 B1 * | 4/2001 | Faure | B64D 15/12 244/17.11 |
| 6,810,750 B1 | 11/2004 | Kiefer | |
| 2005/0247819 A1 * | 11/2005 | Caruso | B60F 5/02 244/2 |
| 2006/0000269 A1 * | 1/2006 | LeMieux | F13D 11/0091 73/170.01 |
| 2008/0036617 A1 | 2/2008 | Arms | |
| 2010/0101335 A1 | 4/2010 | Volanthen | |
| 2010/0216398 A1 | 8/2010 | Finn | |
| 2012/0257847 A1 * | 10/2012 | Allred | B64C 27/35 384/221 |

* cited by examiner

DEVICE FOR MONITORING THE FLAPPING AND/OR LAG BEHAVIOR OF A BLADE OF A ROTORCRAFT ROTOR

CROSS REFERENCE TO RELATED APPLICATIONS

This application claims priority to French patent application No. FR 12 00813 filed on Mar. 19, 2012, the disclosure of which is incorporated in its entirety by reference herein.

BACKGROUND OF THE INVENTION (1) Field of the Invention

The present invention relates to the field of systems for evaluating the behavior of a moving mechanical part in the context of an application to rotors on rotorcraft. The present invention relates more particularly to systems for monitoring the moving behavior of a blade of such a rotor in flapping and/or in lag (i.e. in the lead-lag direction).

(2) Description of Related Art

The present invention provides a rotorcraft rotor fitted with an appliance for capturing information relating to the moving behavior of a blade of the rotor. Said capture appliance is organized to enable the tilting behavior of the blade to be monitored, and more particularly its behavior in flapping and/or in lag, relative to a rotary hub that drives the rotor in rotation.

Rotorcraft are aircraft provided with at least one rotor for driving a rotary wing in rotation. The rotor is constituted in particular by a main rotor that provides at least lift and usually also propulsion for the rotorcraft, or it is a tail rotor that serves to guide the rotorcraft in yaw. The rotor may also be a propulsion propeller, e.g. as used in particular for fitting to a hybrid helicopter.

The rotary wing has blades that are mounted via respective blade roots on a rotor hub that is driven in rotation by a power plant. There are two or more blades, and the blades are radially distributed around the hub. The blades are hinged to the hub and can be operated by a pilot to pivot about their own axes in order to modify the flight behavior of the rotorcraft. Modification of the flight behavior of the rotorcraft is achieved by varying the pitch of the blades at least collectively, and usually also cyclically. The pilot may be constituted in particular either by a person and/or by an autopilot operating under the control of that person.

More particularly, a pilot can cause rotor blades to pivot about their own axes so as to vary their pitch about an axis extending in the general direction in which they extend. Blades are also movable in tilting in their general plane, in flapping and in lag. Such tilting movements of the blade are caused in particular under the effects of the blade being driven in rotation and of aerodynamic effects induced by the blade. The angles of tilt of the blade in flapping and in lag correspond respectively to an angle of tilt of the blade that is transverse or radial relative to the axis of rotation of the hub.

There arises the problem of monitoring the moving behavior of the blade in flapping and/or lag relative to the hub. The present invention seeks to monitor the moving behavior of the blade and to collect pertinent information about the movements to which it is subjected, in particular in flapping and/or in lag. It is more particularly desired to obtain a reliable and accurate analysis of the movements to which the blade is subjected.

Such monitoring is desired in order to assess the lifetime of the mechanical parts making up the rotor, and in order to better organize maintenance operations on the rotor. On the basis of such monitoring, maintenance operations may be performed in response to real needs as determined with respect to the movements that have actually been performed by the blades in flapping and/or in lag.

Such monitoring may also be advantageous for increasing rotorcraft safety. For example, on the basis of monitoring the behavior of the blades, it is possible in real time to alert an operator, and in particular the pilot of the rotorcraft, about a potential failure or about the rotor working excessively or inadequately.

Such monitoring is also desirable to identify potential improvements that could be made to the rotor, concerning its structure and/or its operation, by examining the movements to which the blades are actually subjected over a period and/or during given flying missions.

The behavior of a blade in pivoting so as to vary its pitch is readily determined from the flight controls operated by the pilot. In order to assess all of the movements to which the blade is subjected, there arises the particular problem of monitoring the tilting behavior of the blade, more particularly in flapping and/or in lag. Specific solutions should be implemented in order to monitor the flapping and/or lag movements of the blade.

A system for monitoring the flapping and/or lag behavior of a mounting assembly for mounting blades on the hub of a rotor is known from document FR 2 774 655 (Eurocopter Deutschland). The intention is to detect critical loading states and risks of incidents on the rotor, by detecting torques applied to the hub by all of the blades in flapping and/or in lag.

Said mounting assembly is made up of a plate secured to the blade roots carrying respective blades. The plate forms a common junction member for joining the blade roots to the hub of the rotor. The mounting assembly is made flexible in flapping and/or in lag by the structural arrangement of the blade roots and the plate. The monitoring system comprises strain gauges installed on the mounting assembly in the junction zones between the blade roots and the plate. The strain gauges generate information derived from the deformations to which the mounting assembly is subjected in its general plane and caused by the effects of flapping and/or lag movements of the blades.

The monitoring system proposed in FR 2 774 655 is simple in structure, but it provides limited information about the effects induced on the rotor by the flapping and/or lag movement of the blades. Such information suffices in particular for activating actuators that modify the behavior of the mounting assembly in flapping. In addition, the application of such a monitoring system is restricted to the type of rotor that makes use of a said mounting assembly.

The monitoring system as described in FR 2 774 655 needs to be improved, in order to optimize potential analysis of the movements of the blades in flapping and/or in lag, and in order to increase the uses that can be made of such optimized analysis. The monitoring system also needs to be improved to make it potentially applicable to a rotor that is arranged in any manner, in particular concerning the ways in which the blades are joined to the hub.

Reference may also be made to document US 2010/101335 (Volanthen M. et al.), which describes a system making use of optical sensors for measuring the stresses to which the blades of a rotorcraft rotor are subjected.

Reference may also be made to document US 2008/036617 (Arms Steven W. et al.), which discloses a system for monitoring the behavior of a component of a rotorcraft rotor. A sensor associated with memory means detects the forces to which the component is subjected in order to replace a component that has been subjected to excessive forces.

Reference may also be made to document DE 10 2006 037900 (EADS Deutschland), which discloses a system for monitoring the tensions to which a rotor blade of a rotorcraft are subjected, by making use of a strain gauge implanted at the end of the blade.

Another difficulty to be overcome is associated with the rotating nature of the rotary wing, which makes it difficult to use strain gauges installed on the rotary wing. The rotary nature of the rotary wing also makes it difficult to deliver the electrical power needed to make the monitoring system operate, nor the transfer information from the rotary wing to a member for collecting the information.

In order to illustrate such a difficulty, mention is made by way of example in document US 2010/216398 (Sikorsky Aircraft Corp.) of using transducers in the context of an application to a rotorcraft rotor. More particularly, a solution is proposed for avoiding signal interference between the transmitter and the receiver that are respectively located on a rotor and on a main gearbox of a power plant of the rotorcraft.

Transducers include surface acoustic wave (SAW) transducers. The operation of SAW transducers is based on the principle of the inverse piezoelectric effect. A transducer is placed on a piezoelectric surface and is installed on a mechanical part that is to be monitored. The SAW transducer receives an electromagnetic wave from an interrogation unit, which wave is converted into an acoustic wave. Modification to the physical properties of the acoustic wave is indicative of a modification in the behavior of the mechanical part on which the transducer is installed. The modified acoustic wave is converted in an electromagnetic wave by the SAW transducer and is transmitted to the interrogation unit at given frequencies.

SAW transducers present the advantage of being passive, with the energy needed for making the transducer operate being provided by the electromagnetic wave that is transmitted by the interrogation unit. The information delivered by SAW transducers to the interrogation unit is of good quality, being pertinent and reliable for separation distances between a SAW transducer and the interrogation unit that may be of the order of several meters. SAW transducers can be used as strain gauges, as disclosed in document U.S. Pat. No. 6,810,750 (Invocon Inc.).

In the field of monitoring the operation of a mechanical member, health and usage monitoring systems (HUMS) are also known. By way of example, HUMS systems can be used to monitor temperature in a moving environment and/or to monitor the operation of a moving assembly relative to a stationary structure. The movement of the moving assembly is evaluated by a HUMS system in order to detect any possible defects in its dynamic behavior. HUMS systems are used in the field of rotorcraft.

HUMS systems make use of transducers that associate an information transmitter and a receiver of the transmitted information. The receiver and the transmitter are suitable for being installed respectively at a distance apart from each other, one on a stationary structure and the other on a structure that is movable relative to the stationary structure. Information is transmitted between the transmitter and the receiver by means of waves in order to avoid using a wired connection, which is made difficult because of the relative movement between the stationary structure and the movable structure that is to be monitored.

The accuracy, the pertinence, and the reliability of the information delivered by information sensors, in particular by transducers, depend closely not only on their own specific capacities, but also on features relating to how they are installed on a member that is to be monitored. Such installation features need to be appropriate for enabling good use to be made of the intrinsic performance of the information sensors used. For a rotorcraft rotor, the performance desired for the information sensors must not require them to occupy a large amount of the junction zone between the blade and the hub in order to be installed. The environment of said junction zone must in particular remain available for installing other members, such as pitch rods for pivoting the blades and/or other operating members commonly to be found in rotorcraft rotors.

The ways in which a blade root and a hub are joined together can be complex. For example, the blade root is potentially mounted to be removable from the hub via abutment members such as rolling bearings or a spherical abutment, for example. It is desirable for the ways in which information sensors are installed to be suitable for a rotor of any kind, and more particularly regardless of the ways in which blade roots are joined to the hub.

The use of high performance transducers is appropriate for evaluating the behavior of a blade in flapping and/or in lag. This gives rise to the specific problem of how they are to be installed on the rotor while being able to perform this function, in particular concerning the above-mentioned constraints and difficulties.

A compromise needs to be found in particular between simple, appropriate, and pertinent techniques for performing such an installation, and making best use of the capacities and of the performance of the transducers used. Such a compromise must also take account of ease of installation of the transducer(s) on the rotor, it must be transposable to any kind of rotor without significantly affecting its weight and/or its balance, and more particularly it must be transposable regardless of the way in which blade roots are joined to the hub.

BRIEF SUMMARY OF THE INVENTION

The general object of the present invention is to provide a rotorcraft rotor fitted with an appliance for capturing information relating to the moving behavior of the blades of the rotor in tilting, and more particular in flapping and/or in lag.

It is desirable for said capture appliance to present high performance in terms of accuracy and the frequency at which it delivers information, and it needs to be suitable for co-operating with a remote data receiver located on a stationary structure of the rotorcraft. Said performance and accuracy are desirable in particular to enable the information delivered by a HUMS system to be processed in pertinent manner in order to optimize the analysis thereof.

It is also desirable for the capture appliance to have a structure that is simple and light in weight that can easily be installed on any rotor, while providing a solution that is satisfactory concerning the above-mentioned constraints and difficulties that need to be overcome and concerning the compromise that needs to be found.

The rotorcraft rotor of the present invention has a plurality of blades movably mounted on a hub by means of blade roots respectively associated with each of them. The blades are mounted to move on the hub at least in pivoting about their own axes, under the control of a pilot acting via rods for varying their pitch, either collectively or cyclically. The blades are also movable in their general plane respectively in flapping and/or in lag orientations, at least under the effect of being set into rotation by the hub.

The rotor is fitted with an information capture appliance comprising at least one strain gauge for generating information under the effect of a blade that is allocated thereto being set into movement about either one of the flapping and/or lag orientations. The strain gauge is in particular in dynamic association with the blade root carrying the blade, and it generates information derived from the behavior of the blade carried by the blade root in a flapping orientation or in a lag orientation with which the strain gauge is associated.

In the present invention, such a rotorcraft rotor is recognizable mainly in that the information capture appliance comprises at least one measurement assembly. The measurement assembly comprises a flexible bar having at least one strain gauge installed thereon for generating information relating specifically to the bending of the bar in at least any one of said orientations in flapping and/or in lag. The bar is interposed in engagement at its respective ends between the hub and the blade root that is associated therewith.

The bar is an elongate member that extends between its ends in the same general direction as that in which the blade root on which it is installed extends. The bar is functionally extensive between its zones, considered as end zones that respectively engage the hub and the blade root.

More particularly, the bar is firmly held at its proximal end on the hub, and it bears slidably against the blade root at its distal end to move in both directions along an axis corresponding to a tilting orientation to be monitored. Movement of the blade in a tilting orientation to be monitored causes the bar to deform in bending, with this being measured by the strain gauge and being indicative of the behavior of the blade in this tilting orientation to be monitored.

The bar is suitable for bearing against the blade root along one or more tilting orientations to be monitored. The bar is held firmly to the hub, in particular at least in one tilting orientation to be monitored corresponding to a bending orientation of the bar. The bar is held firmly in this way in particular by anchor means for anchoring the proximal end of the bar to the hub.

At its distal end, the bar at least bears against the blade root, and otherwise may be firmly engaged on the blade root. Depending on the arrangement of the measurement assembly, it should be understood that said bearing is potentially sliding bearing as mentioned below, in order to improve the pertinence of the information obtained by the capture appliance.

Deformation of the bar in bending corresponds to the blade movement that caused such deformation. The strain gauge installed on the bar between its ends measures the amplitude of the bending of the bar caused by a movement of the blade in at least any one of said flapping and/or lag orientations. The bar is a member of the measurement assembly that is specifically dedicated to the function of evaluating the moving behavior of the blade in at least one of said flapping and/or lag orientations.

Each measurement assembly making up the appliance is allocated in particular to a respective blade root, with the bending deformation of the bar of one measurement assembly potentially being different from the bending deformation of a bar of another measurement assembly. It should be understood that, depending on the organization of the measurement assembly allowing the bar to bend in one and/or the other of the flapping and/or lag orientations, the measurement assembly is suitable for evaluating such bending either in flapping, or in lag, or simultaneously both in flapping and in lag. The organization of the measurement assembly depends in particular on varying the section of the bar so as to allow it to bend in at least one of said desired tilting orientations, and/or on varying the ways in which the bar engages the blade root.

The bar is arranged as an elongate member that is flexible between its ends in one and/or the other of said tilting orientations to be monitored. The bar may be flexible in one tilting orientation to be monitored and it may be rigid in another tilting orientation. Flexibility is conferred on the bar in particular as a result of the dimensional characteristics of its cross-section, at least when considered in the zone in which the strain gauge is installed on the bar.

Concerning the dimensions specifying the extent of its cross-section, the thickness of the bar is in particular small in the tilting orientation that is to be monitored in order to make the bar flexible, and conversely, it may be considerable in another orientation in which the blade might move, in order to make the bar rigid. The bar is preferably light in weight, and may be made equally well out of a metal or a polymer.

The concepts of "proximal" and "distal" should be considered relative to the bar extending between its ends that point respectively towards the hub and towards the blade carried by the blade root.

The strain gauge is constituted in particular by a transducer, and potentially by a SAW transducer. The transducer is installed on the bar so as to measure the deformation of the bar caused by the effect of the blade being caused to move in a corresponding tilting orientation that may respectively be in flapping and/or in lag. Such a deformation of the bar, made possible by its flexibility, is the result of the bar being firmly engaged on the hub at its proximal end and of the bar being engaged on the blade root at its distal end, at least so as to bear slidably thereagainst. The bearing engagement of the bar against the blade root is engagement involving opposing bearing forces in the two opposite directions along the tilting orientation under consideration of the blade that is to be monitored, with this applying equally well to flapping and/or lag.

The bar is advantageously firmly engaged at its proximal end on the hub, and bears slidably against the blade root at its distal end.

The sliding nature of said bearing engagement allows for relative movement between the distal end of the bar and the blade root along any tilting orientation other than the tilting orientation under consideration that is to be monitored. In particular, the bar is deformed under the effect of the blade moving in a tilting orientation that is to be monitored that may equally well be in flapping and/or in lag, while remaining stationary relative to the blade root during movements of the blade in at least any one other movement of the blade root that is not to be monitored, in particular in a tilting orientation that is not to be monitored and in pivoting of the blade root about its own axis caused by varying the pitch of the blade carried by the blade root.

The bar remains stationary in that way as a result of the bar bearing slidably at its distal end against the blade root, such slidable bearing allowing the blade root and the distal end of the bar to move relative to each other for a movement that is different from the movement in the tilting orientation that is to be monitored.

For example, the tilting orientation to be monitored may correspond to the blade root moving in lag, thereby causing the bar to bend in lag. Movement of the blade in flapping has no effect on the bending deformation of the bar in flapping. Conversely, and also by way of example, when the tilting orientation to be monitored corresponds to movement of the blade in flapping, that causes bending deformation of the bar in flapping. Movement of the blade in lag has no effect on bending deformation of the bar in lag.

Depending on the particular embodiment, it should be considered that the bar may bear against the blade root both in flapping and in lag, via respective sliding bearing engagements of the bar against the blade root. Relative movement between the bar and the blade root is allowed only in the general direction in which the bar extends and for pivoting movement of the blade root about its own axis.

It is desirable that operating the blade to pivot about its own axis does not lead to stresses in the bar, regardless of the way in which the blade is pivotally mounted on the hub in order to vary its pitch. The sliding bearing of the bar against the blade root, which is applicable equally well in flapping and/or in lag, advantageously procures freedom of relative movement between the distal end of the bar and the blade root for the pivoting orientation of the blade about its own axis in its general plane.

More particularly, the bar bears against the blade root in at least one of said tilting orientations. Relative movement between the bar and the blade root is procured using the following techniques for allowing movement:

in the general direction in which the bar extends, so as to avoid the bar being mounted on the blade root in a manner that is statically undetermined. Mounting the bar to bear slidingly against the blade root avoids the bar being put into compression in the direction in which it extends generally under the effect of being deformed in bending in at least any one of said tilting orientations; and freedom of the blade root to pivot about its own axis, where such pivoting is caused in particular under the effect of varying the pitch of the blade carried by the blade root. Mounting the bar to bear slidingly against the blade root avoids the bar being twisted under the effect of the pitch of said blade being varied by the blade being caused to pivot about its own axis.

In an embodiment, the bar bears against the blade root in flapping and relative movement between the bar and the blade root is provided in lag, in particular in combination with the technique for ensuring relative movement between the bar and the blade root in the general direction in which the bar extends and in pivoting movement of the blade root about its own axis.

In another embodiment, the bar bears against the blade root in lag and relative movement between the bar and the blade root is procured in flapping, in particular in combination with the technique for ensuring relative movement between the bar and the blade root in the general direction in which the bar extends and in pivoting movement of the blade root about its own axis.

In yet another embodiment, the bar bears against the blade root both in flapping and in lag. Under such circumstances, relative movement between the bar and the blade root is procured only along the direction in which the bar extends and for pivoting movement of the blade root about its own axis.

It should be considered that the capture appliance may comprise one or more measurement assemblies installed on respective blade roots, and allocated respectively to monitoring blade movement either in flapping, or in lag, or both in flapping and in lag.

Each of said measurement assemblies of the information capture appliance comprises more particularly:

at least one said strain gauge constituted by a SAW transducer, enabling accurate information to be captured at high frequencies relating to the bending deformation of the bar itself. A wired connection between the SAW transducer and a member for collecting captured information is thus unnecessary. Such a collection member may be constituted in particular by a SAW transducer interrogation unit that also supplies the energy needed for operating the SAW transducer. Such an interrogation unit is suitable for being located at a distance from the rotor, on a stationary member of the rotorcraft, and for being put into communication with a HUMS system; and a structure for mounting the SAW transducer on the rotor. Such a mounting structure is a member that is independent of the way in which the blade is mounted on the hub. The mounting structure enables the SAW transducer to be installed on the rotor between the hub and the blade root that is movable relative to the hub in at least one of said tilting orientations. The mounting structure is an interface between the blade root and one or more SAW transducers, putting them dynamically into communication in at least one orientation for movement of the blade that is to be monitored. Said dynamic communication may be communication in flapping, in lag, or both in flapping and in lag.

The mounting structure includes said flexible bar carrying the SAW transducer between its ends. At its proximal end the bar is provided with anchor means for anchoring it to the hub, and at its distal end it is provided with bearing engagement means, preferably for enabling the bar to be in sliding engagement on the blade root, along at least any one of the flapping and/or lag orientations respectively, and along the direction in which the bar extends and about which the blade root moves in pivoting.

Using a bar can make it easy to install a plurality of spaced-apart SAW transducers on the bar, each associated with capturing information concerning a single one of said tilting orientations that is to be monitored for a single blade. Installing such a plurality of transducers on the bar procures optimized accuracy for the capture appliance by making it possible and simple to install such a plurality of transducers on a single blade root. Use of the bar makes it possible to increase the number of measurement points for a given tilting orientation to be monitored of a given blade, and consequently makes it possible to increase the number of sources of information in order to refine the analysis performed on the basis of this information about the behavior of the blades in flapping and/or in lag.

SAW transducers used for a given tilting orientation that is to be monitored may be installed in isolation or in combination on a single face of the bar and/or on respective diametrically-opposite faces of the bar.

In an advantageous embodiment, the bearing means for sliding engagement are of the type having a spherical bearing surface between the bar and the blade root. The sliding bearing engagement of the bar on the blade root may be procured by means of a structure that is simple.

For example, the sliding bearing engagement means act for a given said tilting orientation to associate at least two opposing spherical bearing surfaces of the bar along respective opposite guide surfaces forming parts of the blade root.

The distal end of the bar bears against the blade root respectively for each of the directions of movement of a tilting orientation that is to be monitored. Such opposing bearing points are preferably in the form of at least two opposite bearing points in one and the other of said directions, or else on the basis of a plurality of bearing points distributed radially around the circumference defined mutually between spherical bearing surfaces.

In a preferred embodiment, the sliding bearing engagement means associate a sphere formed at the distal end of the bar in co-operation with skids for guiding the sphere and arranged on said blade root.

The mounting structure enables appropriate use to be made of one or more SAW transducers by being reduced:

a) to the bar having a sphere at its distal end and anchor means at its proximal end; and b) to skids that may be constituted merely as blocks fitted on the blade root by cementing. The skids may include guide paths for guiding the sphere depending on the corresponding tilting orientation to be monitored. The skids are advantageously made of an elastomer material and they are fitted to the blade root by cementing.

In an embodiment, the anchor means are of the mutual-engagement type enabling the proximal end of the bar to be firmly secured to the hub in any movement direction. Such mutual-engagement means prevent any movement of the bar relative to the hub, other than the intrinsic deformation of the bar due to bending.

The mutual-engagement anchor means may be of simple structure, e.g. they may comprise a plate for fastening the bar to the hub. Such a fastening plate is preferably shaped as a bracket or in an analogous angled shape so as to provide an angular offset between the bar and a member of the hub that is used for anchoring the bar.

The use of such a plate enables the bar to be anchored in simple manner on the hub while extending in the direction in which the blade root under consideration extends between the hub and the blade carried by the blade root.

The use of such a plate also makes it possible to limit the overall size of the mounting structure by making it possible to install it in a cell included in the blade root, such as an internal recess. Such an internal recess may correspond to an axial recess in a sleeve forming a removable blade root for joining the blade to the hub.

The use of such a plate also makes it easy to position the bar accurately on the blade root with the bar extending in a direction that corresponds to the pitch pivot axis of the blade and/or, where applicable, to the direction in which the blade root comes into axial abutment against the hub.

In another embodiment, the anchor means are of the type in which the bar is pivotally mounted on the hub about a pivot finger. The pivot finger extends in the orientation whereby the bar bears against the blade root corresponding to the tilting orientation to be monitored by monitoring bending of the bar. Such pivotal mounting of the bar on the hub prevents the bar from moving on the hub in the tilting orientation to be monitored, while allowing the bar to move on the hub in another tilting orientation that is not to be monitored.

Such a pivotal mount for the bar on the hub enables the bar to accompany the movement of the blade root in said tilting orientation that is not to be monitored. The amplitude of such accompanying movement is potentially large, and the pivotal mounting of the bar avoids any need to increase correspondingly the overall size of the measurement assembly in said other tilting direction that is not to be monitored. The extent of the bar between its ends may be increased in order to increase the sensitivity with which deformation of the bar in bending is detected by the strain gauge for the tilting orientation that is to be monitored, without that making it necessary to significantly increase the size of the blade root in the direction corresponding to the tilting orientation that is not to be monitored.

For example, the blade is potentially movable in flapping through a significant amplitude, e.g. of the order of plus or minus 25°. Mounting the bar to pivot in flapping on the hub prevents the bar from moving in lag, other than as a result of the bar bending in lag, while allowing the bar to flap on the hub so as to accompany the flapping movement of the blade root.

The guide surfaces of the skids along which the bar slides are preferably provided with a hard coating presenting a surface state that presents as little roughness as is reasonably possible. Such arrangements facilitate sliding of the sphere by limiting the effects of friction caused by the sphere traveling along the skids. Such a coating may be based in particular on Teflon, on metal, or on an analogous material for providing protection against wear and presenting a low coefficient of friction.

The ways in which the skids are made and in which they are fastened to the blade root by cementing make it possible to simplify the organization of the mounting structure. Fabricating the skids by using an elastomer material and installing them on the blade root by cementing can be performed at low cost, while avoiding adding complexity to the mounting structure, and while preserving the blade root from extra weight that might generate unbalance.

The number of measurement assemblies installed on respective blade roots is determined depending on the number of information sensors desired for a given tilting orientation to be monitored of the rotor blades.

For example, a plurality of measurement assemblies are individually installed on respective blade roots. At least one first measurement assembly may be allocated to capturing information about movements of the blade in flapping. At least one other measurement assembly may be allocated to capturing information about movements of another blade in lag.

For a given rotor revolution, good analysis can be obtained by combining information delivered respectively by various measurement assemblies. Such satisfactory analysis may be obtained in particular by using strain gauges constituted by SAW transducers, which are installed on the rotor by means of a said mounting structure that enables best use to be made of their performance.

In a particular embodiment, at least a third measurement assembly is installed on a blade root that is allocated thereto, being dedicated to capturing information about the movements of the corresponding blade carried by the blade root, both in flapping and in lag.

In yet another particular embodiment, the spherical bearing surfaces of the bar bearing slidingly against the blade root are distributed radially around a circumference that they define between them, thereby providing at least two diametrically-opposite sliding bearing points at the distal end of the bar against the blade root for each of the tilting orientations to be monitored. Under such circumstances, the sliding of the bearing points of the bar against the blade root should be considered relative to the direction in which the bar extends and/or the direction in which the pivot axis of the blade extends.

The bar may have a cross-section that is regular, e.g. having the shape of a regular polygon or of a disk. Such a regular cross-section defines a small thickness to the bar in any direction in which its cross-section extends so as to allow the bar to deform in bending in both of the tilting orientations to be monitored, respectively in flapping and in lag.

The bar may also be of irregular section, both transversely and longitudinally. The shape of the bar concerning its cross-section and/or its longitudinal section may be used to impart localized characteristics in bending deformability to the bar. Such localized bending deformability characteristics of the bar are advantageously used, depending on the organization and/or on the position(s) on the bar of the strain gauge(s), in order to improve the accuracy of the measurement information delivered by the strain gauge.

The appliance may be suitable for being no more than a single measurement assembly, while still providing measurement information that can be analyzed in optimized manner, in particular by a HUMS system. Such a single measurement assembly is installed in a single blade root of the rotor and is devoted to monitoring the behavior of a single blade of the rotor, both in flapping and in lag. On the basis of the information delivered by such a single measurement assembly, the information can be transposed in pertinent manner for monitoring the behavior of all of the blades of the rotor.

It should also be considered that the appliance may also comprise a plurality of measurement assemblies allocated to respective different blade roots of the rotor, or indeed to all of them, in order to monitor the behavior of the blades of the rotor in one or more tilting orientations for each of the blade roots.

The simplicity and the lightness of the mounting structure enables a limited number of measurement assemblies different from the number of blade roots of the rotor to be installed on a single blade root or on two adjacent blade roots, without that running the risk of leading to a significant unbalance of the rotor.

The number of measurement assemblies to be installed respectively on the various blade roots of the rotor is determined depending on the desired accuracy and the desired amount of information that is to be captured for use in analyzing the behavior of respective blades for a given tilting orientation that is to be monitored. Said number is selected depending on the number of measurement points desired per revolution of the rotor.

It is found that using a single SAW sensor provides accurate information concerning the bending stressing of the bar on which the single SAW sensor is installed. Such accuracy is obtained by the ability of the single SAW sensor carried by the mounting structure to deliver measurement information that is not only accurate in terms of individual measurements, but also measurement information that is delivered in sufficient quantity for a given revolution of the rotor, where an optimized quantity is of the order of at least 20 measurement points of bar bending per revolution of the rotor.

Using measurement assemblies placed on blade roots that are mounted in diametrically-opposite positions on the rotor makes it possible to obtain information concerning a given tilting orientation of the blades that are situated in two opposite azimuth directions, respectively for a blade that is "advancing" and for a blade that is "retreating".

The or each measurement assembly is suitable for being individually housed in a cell included in the corresponding blade root. Such a cell advantageously constitutes a member for protecting the measurement assembly or assemblies from the outside environment.

Such a cell is potentially a cell specifically dedicated to receive a measurement assembly, or is advantageously formed by a recess that is structurally included in a blade root, such as a blade root that is in the form of a sleeve.

The simple and compact arrangement of the mounting structure enables it be housed inside such a protective cell and in a blade root of any arrangement, including one for releasably connecting the blade root to the hub via at least one axial abutment member.

For example, the blade root may be arranged as a sleeve releasably mounted on the hub via an axial abutment member. For example, such an axial abutment member may be constituted by at least one bearing member, or indeed and preferably by a spherical abutment. The measurement assembly allocated to such a blade root is advantageously housed inside the sleeve, the bar being in alignment on the abutment axis.

With the said axial abutment member being arranged in spherical abutment, the anchor means are advantageously formed by a plate that is shaped as a bracket or the like. Said bracket engages both with the proximal end of the bar and with a pin for fastening the spherical abutment to the hub.

BRIEF DESCRIPTION OF THE SEVERAL VIEWS OF THE DRAWINGS

Embodiments of the present invention are described below with reference to the figures in the accompanying sheets, in which.

DETAILED DESCRIPTION OF THE INVENTION

Figure 1:
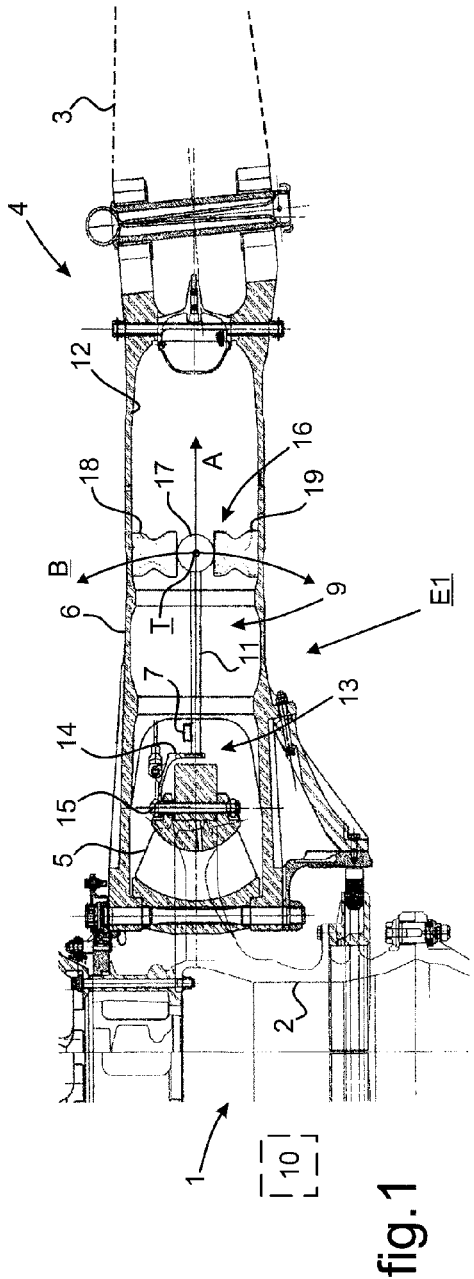
FIGS. 1 and 2 are fragmentary diagrammatic views of a rotorcraft rotor fitted with a first measurement assembly of an information capture appliance of the present invention, shown respectively in lateral section and in cross-section.

In FIGS. 1 to 7, a rotorcraft rotor 1 comprises a hub 2 having blades 3 pivotally mounted thereon via respective blade roots 4. For each of the blades 3, the blade root 4 constitutes a junction member for connecting the blade 3 to the hub 2, being interposed between them in the direction in which the blade root generally extends.

In the arrangement of the rotor 1 that is shown by way of example in the figures, the blade root 4 is removably mounted on the hub 2 via an axial abutment member 5, which can be seen more particularly in FIGS. 1, 3, 5, and 6. Such an axial abutment member 5 is arranged in particular as a spherical abutment. The blade root 4 is shaped as a sleeve 6, and it is fastened at its proximal end to the hub 2 by pins, at two points that are axially spaced apart in the general direction in which the blade root 4 extends.

The blades 3 are pivotally mounted to the hub 2 in order to enable the pilot to vary their pitch, either cyclically or collectively. Setting the rotor 1 into rotation causes the blades 3 to move in inclination, tilting in two orientations: respectively in flapping B and in lag T. There is a need to monitor the behavior of blades 3 in flapping B and in lag T by means of a monitoring system implementing an information capture appliance installed on the rotor 1. Such an information capture appliance is adapted to be associated with a HUMS system in order to obtain reliable, accurate, and pertinent analysis of the behavior of the blades 3 in flapping B and in lag T.

The appliance comprises at least one measurement assembly E1, E2, E3, E4 installed on a blade root 4 that is associated therewith. The measurement assembly comprises one or more strain gauges 7, 8 and a mounting structure 9 for mounting the strain gauge(s) 7, 8 on the rotor 1. The or each of the strain gauges 7, 8 is individually constituted by a SAW transducer suitable for co-operating with a remote interrogation unit 10 located on a stationary member of the rotorcraft.

The mounting structure 9 comprises a bar 11 having the strain gauge(s) 7, 8 installed therein and means for enabling the respective ends of the bar 11 to engage the hub 2 and the blade root 4. The bar 11 extends in the general direction in which the blade root 4 extends with the bar 11 being installed on the blade root 4.

As can be seen more particularly in FIGS. 1, 3, 5, and 6, the bar 11 is housed inside a cell 12 included in the blade root in order to protect the strain gauge(s) 7, 8 from the outside environment. With reference to the particular arrangement of the rotor 1 that is shown, the recess inside the sleeve 6 is advantageously used to form the cell 12 for receiving a said measurement assembly E1, E2, E3, E4 forming part of the appliance.

The bar 11 is fitted at its proximal end with anchor means 13 for engaging the hub 2. Such anchor means 13 are constituted as a bracket-shaped fastener plate 14. The plate 14 is fastened both to the hub 2 and to the proximal end of the bar 11. The bracket shape of the fastener plate 14 provides a right angle between the general direction in which the bar 11 extends and a member secured to the hub 2 that is used for anchoring the bar 11.

With reference to the particular arrangement of the rotor that is shown, such a bracket-shaped plate 14 may be engaged on the hub 2 by means of a fastener pin 15 for fastening the sleeve 6 to the hub 2. The general direction in which the bar 11 extends is aligned on the center of rotation of the axial abutment member 5, and extends along the blade root 4.

The bar 11 is fitted at its distal end with sliding engagement means 16 sliding on the blade root 4 in at least any one of the tilting orientations of the blade in flapping B and/or in lag T. Such means associate a sphere 17 made at the distal end of the bar 11 with co-operating guide skids 18, 19 for guiding the sphere 17. The skids 18, 19 are advantageously made of elastomer material and they are mounted on the blade root 4 by cementing.

For each of the tilting orientations B and T of the blade 3 that is to be monitored, the bar 11 bears in sliding engagement in both directions for a given tilting orientation B, T. In the embodiments shown, the skids 18, 19 are two in number for each of the titling orientations B, T of the blade 3, each skid 18, 19 being used for enabling the bar 11 to bear in sliding engagement in a respective direction for one of said tilting orientations B, T.

The bar 11 bearing in sliding engagement on the blade root 4 enables the bar 11 to be free to move relative to the blade root 4, at least in the general direction A in which it extends, so as to avoid causing the bar 11 to be mounted on the blade root 4 in statically undetermined manner. The bar 11 is also likely to be free to move relative to the blade root 4 in the flapping B or lag T tilting orientation of the blade 3 that is different from the orientation to be monitored by the strain gauges 7, 8 carried by the corresponding bar 11, as shown in FIGS. 1 to 4. The bar 11 is also free to move relative to the pivoting movement of the blades 3 that serves to vary their pitch, so as to avoid affecting the pertinence of the information sought by means of the strain gauges 7, 8. Such information that is being sought corresponds to accurately detecting the deformations of the bar 11 in the tilting orientations of the blade 3, respectively in flapping B and/or in lag T.

The bar 11 is flexible in one of the tilting orientations of the blade being monitored. The flexible nature of the bar 11 corresponds to its ability to bend in at least one of the tilting orientations of the blade in flapping B and/or in lag T, and, where applicable, to its ability to withstand being deformed in another one of these tilting orientations B, T.

The flexibility of the bar 11 in one and/or the other of the tilting orientations in flapping B and/or in lag T is imparted thereto in particular as a result of the way its cross-section is shaped. With respect to its longitudinal section, the bar 11 is likely to flare towards its proximal end in order to improve its anchoring on the hub 2, and to taper towards its distal end in order to make it easier to form the sphere 17.

For example in FIGS. 1 to 4, the bar 11 is narrow relative to one of the tilting orientations in flapping B and/or in lag T that is to be monitored, and it is wide relative to the other tilting orientation B, T. The bar 11 is flexible in the tilting orientation that is to be monitored and it is robust in the other tilting orientation. The reliability of the information delivered by the strain gauges 7, 8 is optimized by preventing the bar 11 from deforming in a tilting orientation that is not to be monitored by the strain gauges 7, 8 carried by the bar 11.

Figure 2:
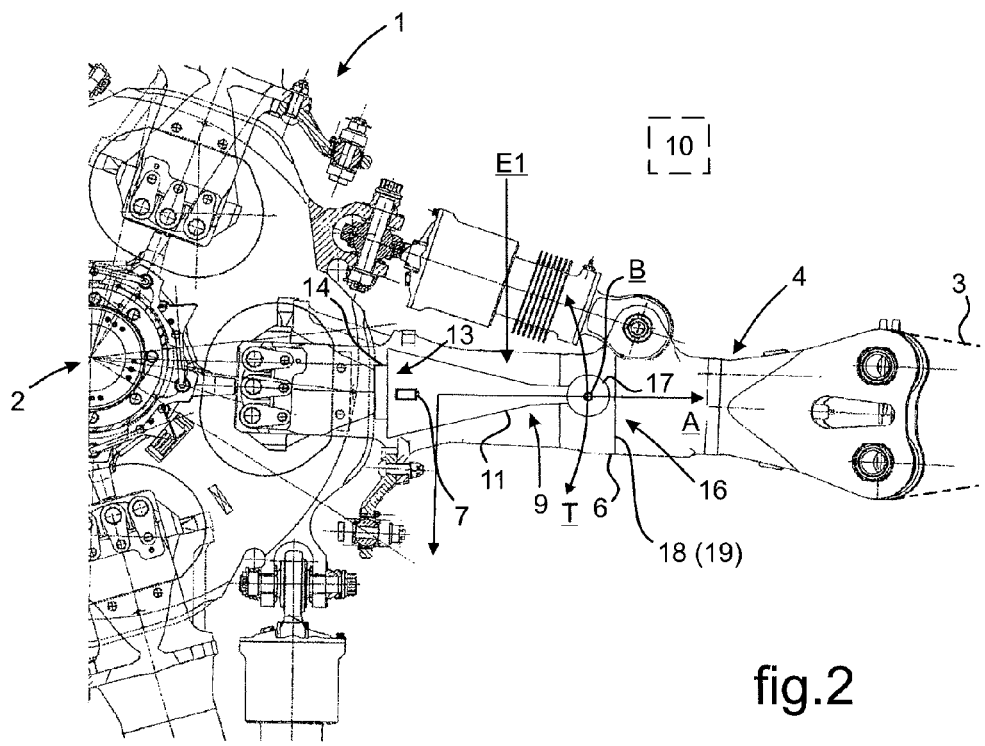

More particularly, in FIGS. 1 and 2, a first measurement assembly E1 is allocated to monitoring the behavior of the blade 3 in flapping B. The bar 11 is narrow in this orientation in flapping B and it is wide in the other orientation in lag T. The appliance may have a single first measurement assembly E1 or it may have a plurality of first measurement assemblies E1 for monitoring the flapping B of respective ones of the blades 3.

Figure 3:
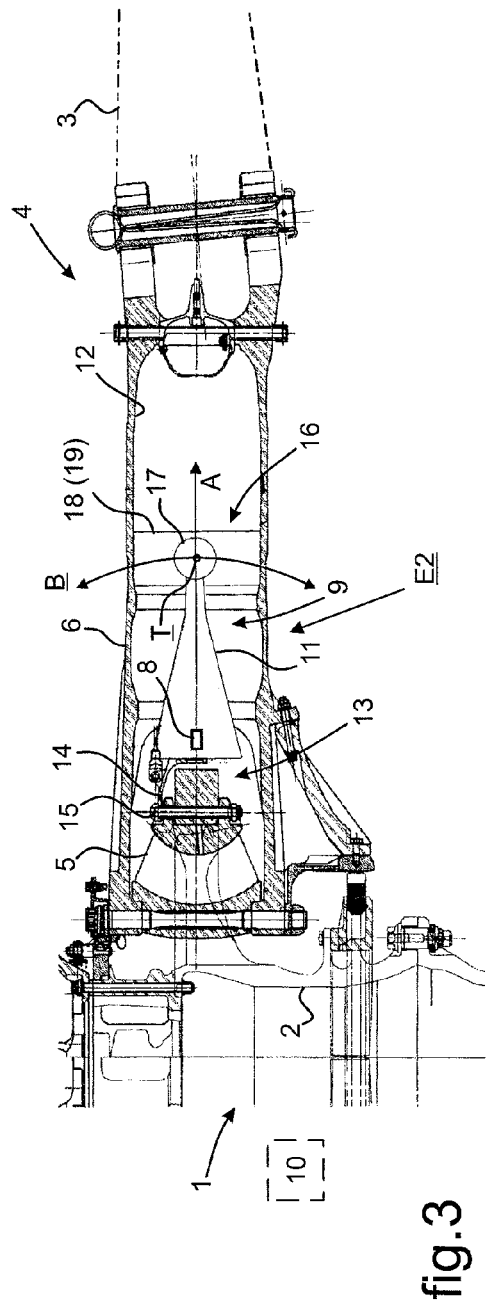
FIGS. 3 and 4 are fragmentary diagrammatic views of a rotorcraft rotor fitted with a second measurement assembly of an information capture appliance of the present invention, respectively shown in lateral section and in cross-section.
Figure 4:
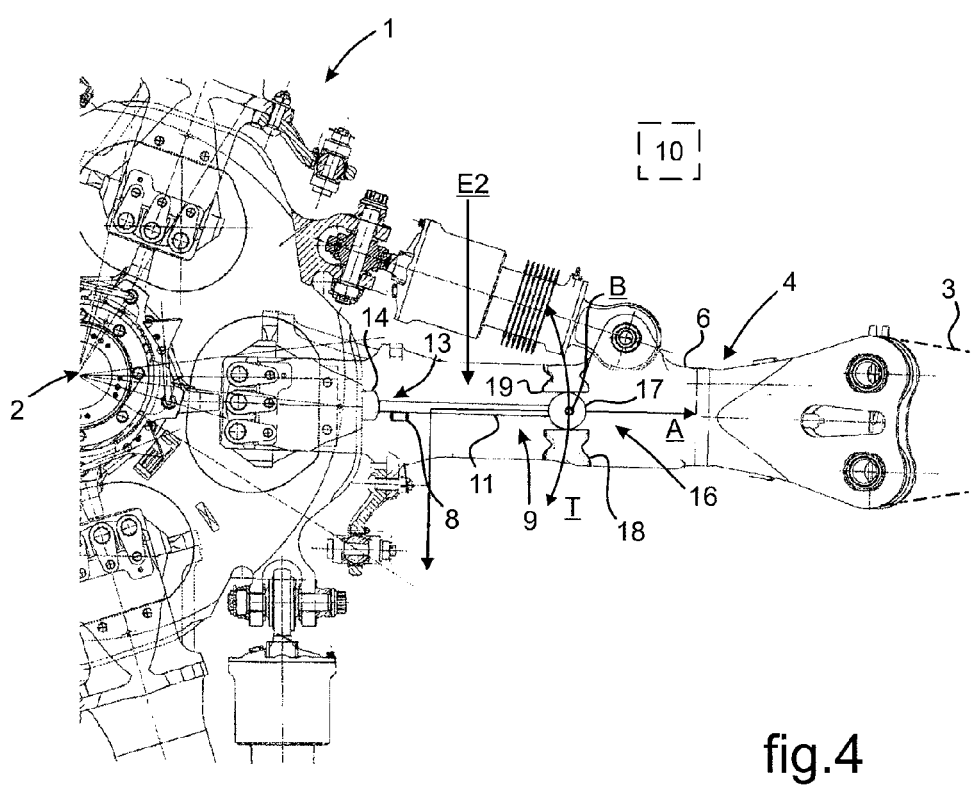

Still more particularly in FIGS. 3 and 4, a second measurement assembly E2 is for monitoring the behavior of a blade 3 in lag T. The bar 11 is narrow in this orientation in lag T and it is wide in the other orientation in flapping B. The appliance is suitable for including a single measurement assembly E2, or a plurality of measurement assemblies E2 for monitoring respective ones of the blades 3 in lag T.

The appliance preferably comprises at least one first measurement assembly E1, as shown in FIGS. 1 and 2, and at least one second measurement assembly E2, as shown in FIGS. 3 and 4. The first measurement assembly E1 and the second measurement assembly E2 are engaged in respective blade roots 4. The number of measurement assemblies E1 and E2 forming parts of the appliance is determined depending on the accuracy and frequency desired for the information, in particular as a function of the number of measurement points desired per revolution of the rotor 1.

Figure 5:
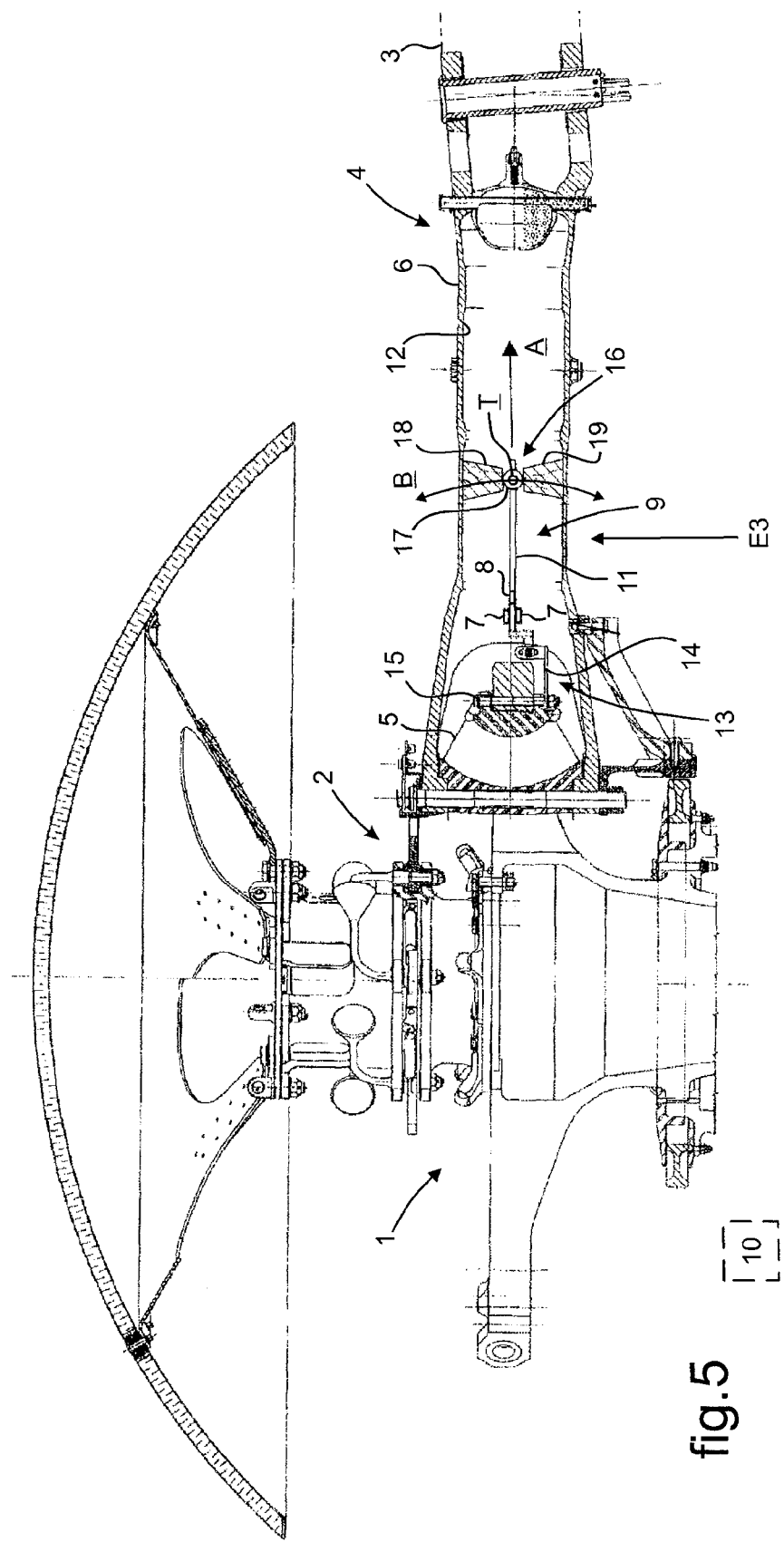
FIG. 5 is a fragmentary diagrammatic view in cross-section of a rotorcraft rotor fitted with a third measurement assembly of an information capture appliance of the present invention.
Figure 6:
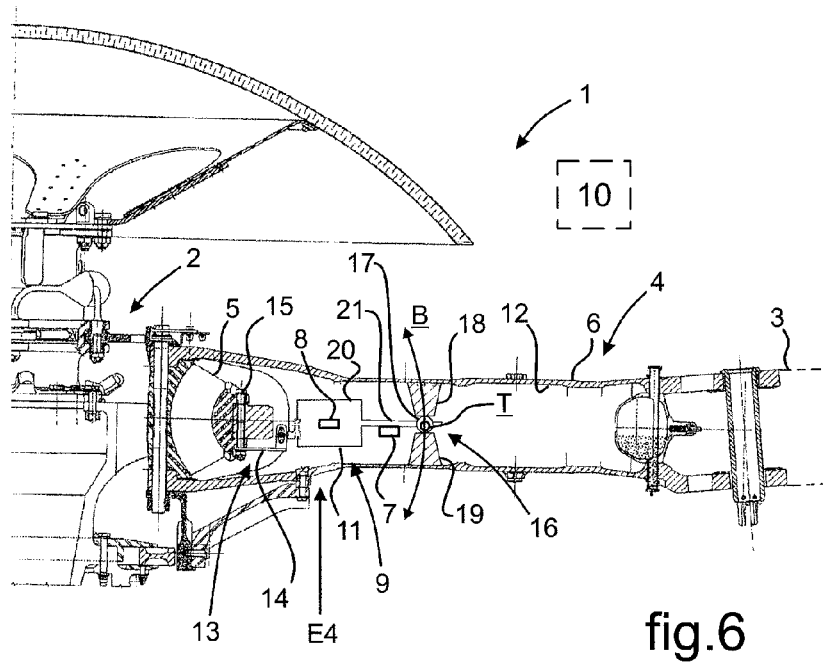
FIGS. 6 and 7 are fragmentary diagrammatic views of a rotorcraft rotor fitted with a fourth measurement assembly of an information capture appliance of the present invention, shown respectively in lateral section and in cross-section.
Figure 7:
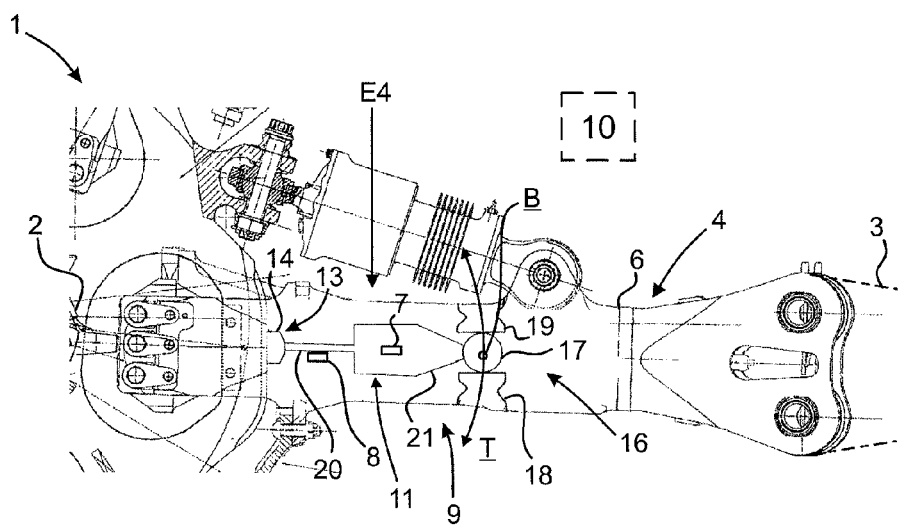

In a particular embodiment of a third measurement assembly E3 and a fourth measurement assembly E4 shown respectively in FIG. 5 and in FIGS. 6 and 7, the bar 11 is flexible in one or the other of the orientations in flapping B and in lag T.

In FIG. 5, the third measurement assembly E3 has a narrow bar 11 of regular cross-section. The bar 11 carries a plurality of strain gauges 7, 8. A first strain gauge 7 is for monitoring movement of the blade 3 in flapping B, and a second strain gauge 8 is for monitoring movement of the blade 3 in lag T.

In FIGS. 6 and 7, a fourth measurement assembly E4 includes a bar 11 of irregular section having two distinct portions 20, 21 in succession along the general direction in which it extends. A distal portion 21 of the bar 11 carries a first strain gauge 7 for monitoring movement of the blade 3 in flapping B. The distal portion 21 of the bar 11 is narrow and flexible in the tilting orientation in flapping B and it is wide and robust in the tilting orientation in lag T. A proximal portion 20 of the bar 11 carries a second strain gauge 8 for monitoring movement of the blade 3 in lag T. The proximal portion 20 of the bar 11 is narrow and flexible in the tilting orientation in lag T and it is wide and robust in the tilting orientation in flapping B.

The appliance may also have one or more third and/or fourth measurement assemblies E3 and/or E4, or indeed it may comprise in combination one or more first measurement assemblies E1, one or more second measurement assemblies E2, and one or more third and/or fourth measurement assemblies E3 and/or E4, for monitoring respective movements of the blades 3.

The capture appliance is easily adapted both concerning the information sought relating to the behavior of the blades 3 in flapping and/or in lag, and concerning how it is installed on any rotor.

With reference to said information that is sought and depending on requirements the capture appliance may comprise selectively any one of the measurement assemblies E1, E2, E3, E4 installed on only one blade root 4, or a plurality of measurement assemblies E1, E2, E3, E4 respectively distributed between the various blades 3 of the rotor 1.

The numbers of measurement assemblies E1, E2, E3, E4 and the ways in which they are selectively located on the various blades 3 of the rotor 1 may be selected depending on the frequency at which information is to be delivered by the capture appliance over one revolution of the rotor 1, and/or depending on the tilting orientation of the movement of the blade 3 that is to be monitored in flapping and/or in lag, and/or indeed relative to the "advancing" or "retreating" situation of a blade 3 during a given revolution of the rotor 1.

With respect to installing the appliance on any rotor 1, the mounting structure 9 enables pertinent use to be made of strain gauges 7, 8 that are advantageously constituted by SAW transducers. The appliance may be implanted on a rotor 1 regardless of the way in which junctions are made between the blades 3, the blade roots 4 supporting the blades, and the hub 2. These kinds of junction need to be taken into consideration in particular relative to whether the blade roots 4 are mounted individually or collectively on the hub 2, or indeed on whether the blade roots 4 are mounted to be individually removable from the hub 2.

What is claimed is:

1. A rotorcraft rotor having a plurality of blades movably mounted on a hub by respective blade roots that are associated therewith, the blades being movable in pivoting about their own axes and about tilting orientations respectively in flapping and in lag, the rotor being fitted with an information capture appliance having at least one strain gauge for generating information depending on the behavior of the blades in moving about at least any one of the orientations in flapping and/or in lag, wherein the information capture appliance includes at least one measurement assembly having a flexible bar having the at least one strain gauge mounted thereon to generate information about the bending of the bar in at least any one of the orientations in flapping and/or in lag, the bar being connected at its respective ends between the hub and a blade root that is associated therewith, wherein the blade root is arranged as a sleeve removably mounted on the hub by means of at least one axial abutment member, and the measurement assembly allocated to the blade root is housed inside the sleeve, the bar being in alignment on the abutment axis, and wherein the axial abutment member is arranged as a spherical abutment, and the anchor means are formed by a plate that is bracket-shaped and that engages both on the proximal end of the bar and on a pin for fastening the spherical abutment to the hub.

2. A rotor according to claim 1, wherein the bar is firmly engaged at its proximal end to the hub and bears slidably against the blade root at its distal end.

3. A rotor according to claim 2, wherein the bar is dimensional to bear against the blade root relative to at least one of the tilting orientations, with the bar and the blade root being free to move relative to each other in a general direction in which the bar extends and in pivoting of the blade root about its own axis.

4. A rotor according to claim 1, wherein the bar is dimensional to bear against the blade root in flapping, with relative freedom to move being arranged between the bar and the blade root in lag.

5. A rotor according to claim 1, wherein the bar is dimensional to bear against the blade root in lag, with relative freedom to move being arranged between the bar and the blade root in flapping.

6. A rotor according to claim 1, wherein the bar is dimensional to bear against the blade root in flapping and in lag.

7. A rotor according to claim 1, wherein each of measurement assemblies of the information capture appliance includes:
   at least one the strain gauge constituted by a SAW transducer; and
   a mounting structure for mounting the SAW transducer on the rotor, the mounting structure comprising the flexible bar carrying the SAW transducer between its ends, the bar being provided at its proximal end with anchor means for anchoring on the hub and at its distal end bearing means for slidably engaging the bar against the blade root.

8. A rotor according to claim 7, wherein the bearing means for sliding engagement are of the type having a spherical bearing surface between the bar and the blade root.

9. A rotor according to claim 7, wherein the bearing means for sliding engagement act for a given tilting orientation to associate at least two opposing spherical bearing surfaces of the bar along respective opposite guide surfaces forming parts of the blade root.

10. A rotor according to claim 7, wherein the bearing means for sliding engagement associate a sphere formed at the distal end of the bar in co-operation with skids for guiding the sphere and arranged on the blade root.

11. A rotor according to claim 10, wherein the skids are made of elastomer material and are fitted on the blade root by cementing.

12. A rotor according to claim 7, wherein the anchor means are of the mutual engagement type, the proximal end of the bar being secured to the hub.

13. A rotor according to claim 12, wherein the anchor means comprise a fastener plate for fastening the bar on the hub.

14. A rotor according to claim 7, wherein the anchor means are of the type for pivotally mounting the bar on the hub about a pivot extending in the bearing engagement orientation of the bar against the blade root.

15. A rotor according to claim 1, wherein a plurality of measurement assemblies are installed individually on respective blade roots, at least a first measurement assembly being allocated to capturing information relating to a blade being caused to move in flapping, and at least one second measurement assembly being associated with capturing information relating to another blade moving in lag.

16. A rotor according to claim 1, wherein at least a third measurement assembly is installed on a blade root that is allocated thereto, being dedicated to capturing information about the movements of the corresponding blade both in flapping and in lag.

17. A rotor according to claim 1, wherein the appliance is housed in a cell included in the blade root.

* * * * *